US009928747B2

United States Patent
Rein-Weston et al.

(10) Patent No.: US 9,928,747 B2
(45) Date of Patent: Mar. 27, 2018

(54) SYSTEM AND METHOD FOR CALCULATING A FUEL CONSUMPTION DIFFERENTIAL CORRESPONDING TO AN AIRCRAFT TRAJECTORY REVISION

(71) Applicant: The Boeing Company, Chicago, IL (US)

(72) Inventors: Karl J. Rein-Weston, Seattle, WA (US); Colette A. Posse, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/675,178

(22) Filed: Mar. 31, 2015

(65) Prior Publication Data

US 2016/0293016 A1 Oct. 6, 2016

(51) Int. Cl.
| | | |
|---|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G08G 5/00 | (2006.01) |
| G01C 21/34 | (2006.01) |

(52) U.S. Cl.
CPC ....... *G08G 5/0039* (2013.01); *G01C 21/3469* (2013.01); *G05D 1/0005* (2013.01)

(58) Field of Classification Search
CPC . G08G 5/0039; G05D 1/0005; G01C 21/3469
USPC .......................................................... 701/3
See application file for complete search history.

(56) References Cited

U.S. PATENT DOCUMENTS

| | | | |
|---|---|---|---|
| 2010/0241345 A1* | 9/2010 | Cornell | G08G 5/0013 701/120 |
| 2013/0238174 A1* | 9/2013 | Dewas | G05D 1/101 701/16 |

OTHER PUBLICATIONS

Lovegreen et al., "Estimation of Potential Aircraft Fuel Burn Reduction in Cruise Via Speed and Altitude Optimization Strategies," MIT International Center for Air Transportation, Report No. ICAT-2011-03 (2011).*

(Continued)

*Primary Examiner* — Aaron L Troost
*Assistant Examiner* — Paula L Schneider
(74) *Attorney, Agent, or Firm* — Walters & Wasylyna (57) ABSTRACT

A method for calculating a fuel consumption differential corresponding to an aircraft changing from an original trajectory (which incorporates the cost model of the airline through speed and altitude parameters within the flight plan) to a revised trajectory, the method including (1) calculating a first total excess energy associated with flying the aircraft at the original trajectory beginning at an execution time, the first total excess energy including excess energy due to climb and excess energy due to deviation of the original trajectory from an efficiency curve of the aircraft; (2) calculating a second total excess energy associated with flying the aircraft at the revised trajectory beginning at the execution time, the second total excess energy including excess energy due to climb and excess energy due to deviation of the revised trajectory from the efficiency curve; (3) comparing the first and second total excess energies to obtain a total excess energy differential; and (4) calculating the fuel consumption differential based on the total excess energy differential.

20 Claims, 5 Drawing Sheets

(56) References Cited

OTHER PUBLICATIONS

Konyak, "Improving Ground-based Trajectory Prediction Through Communication of Aircraft Intent," *AIAA Guidance, Navigation, and Control Conference* (2009).
Lovegren et al., "Estimation of Potential Aircraft Fuel Burn Reduction in Cruise Via Speed and Altitude Optimization Strategies," *MIT International Center for Air Transportation*, Report No. ICAT-2011-03 (2011).

* cited by examiner

SYSTEM AND METHOD FOR CALCULATING A FUEL CONSUMPTION DIFFERENTIAL CORRESPONDING TO AN AIRCRAFT TRAJECTORY REVISION

FIELD

This application relates to air travel and, more particularly, to aircraft fuel management.

BACKGROUND

The direct operating expense associated with operating a typical commercial jet aircraft includes various components, such as maintenance, ownership, distribution, charges, passenger services, operations, and fuel. According to the International Air Transport Association (IATA.org), fuel cost is one of the largest components—if not the largest component—of the direct operating expense of a commercial jet aircraft. Indeed, depending on the fluctuating price of crude oil, fuel cost can account for over 30 percent of the direct operating expense of a commercial jet aircraft.

Aircraft pilots and their supporting Airline Operations Center (AOC) often look for ways to improve the economics of air travel, such as by reducing an aircraft's fuel consumption. Fuel consumption may be reduced by flying an aircraft at a more efficient trajectory (speed and altitude). However, aircraft pilots are not free to fly at any desired trajectory. Rather, aircraft pilots are typically instructed by Air Traffic Control (ATC) to fly at a certain trajectory along a particular route, thereby ensuring an orderly flow of traffic through the commercial airspace. Any proposed revision to the trajectory and route desired by the airline must be negotiated with Air Traffic Control.

Currently, there is no simple way to determine, in real time, the fuel efficiency gained or lost due to a revision of an aircraft's trajectory. The prevailing option currently available is to invoke the on-board Flight Management Computer to execute the revised trajectory without knowing the quantity of fuel that will be remaining at destination. This prevailing option does not offer the economic trades for a range of negotiation possibilities to accommodate negotiations with Air Traffic Control for a more efficient flight trajectory.

Accordingly, those skilled in the art continue with research and development efforts in the field of aircraft fuel management.

SUMMARY

The disclosed system and method provide an in-flight aid to negotiate with Air Traffic Control a more efficient flight trajectory for an aircraft trajectory revision.

In one embodiment, the disclosed method for calculating a fuel consumption differential corresponding to an aircraft changing from an original trajectory (which incorporates the cost model of the airline through speed and altitude parameters within the flight plan) to a revised trajectory, the change occurring at an execution time, may include the steps of (1) calculating a first total excess energy associated with flying the aircraft at the original trajectory beginning at the execution time, the first total excess energy including excess energy due to climb and excess energy due to deviation of the original trajectory from an efficiency curve of the aircraft; (2) calculating a second total excess energy associated with flying the aircraft at the revised trajectory beginning at the execution time, the second total excess energy including excess energy due to climb and excess energy due to deviation of the revised trajectory from the efficiency curve; (3) comparing the second total excess energy with the first total excess energy to obtain a total excess energy differential; and (4) calculating the fuel consumption differential based on the total excess energy differential.

In another embodiment, the disclosed method for calculating a fuel consumption differential corresponding to an aircraft changing from an original speed and an original altitude to a revised speed and a revised altitude may include the steps of (1) calculating a first total excess energy associated with flying the aircraft at the original speed and the original altitude, the first total excess energy including excess energy due to a difference between the original altitude and an ideal altitude for the original speed; (2) calculating a second total excess energy associated with flying the aircraft at the revised speed and the revised altitude, the second total excess energy including excess energy due to climb, if the revised altitude is greater than the original altitude, and excess energy due to a difference between the revised altitude and an ideal altitude for the revised speed; (3) comparing the second total excess energy with the first total excess energy to obtain a total excess energy differential; and (4) calculating the fuel consumption differential based on the total excess energy differential.

In yet another embodiment, the disclosed system for displaying a fuel consumption differential corresponding to an aircraft changing, at an execution time, from an original trajectory to a revised trajectory may include a display device and a processor configured to calculate the fuel consumption differential based on a comparison of a first total excess energy associated with flying the aircraft at the original trajectory beginning at the execution time, the first total excess energy including excess energy due to climb and excess energy due to deviation of the original trajectory from an efficiency curve of the aircraft, and a second total excess energy associated with flying the aircraft at the revised trajectory beginning at the execution time, the second total excess energy including excess energy due to climb and excess energy due to deviation of the revised trajectory from the efficiency curve, wherein the calculated fuel consumption differential is displayed on the display device.

Other embodiments of the disclosed system and method for calculating a fuel consumption differential corresponding to an aircraft trajectory revision include incorporating the aircraft's efficiency curve, the cost model of the airline obtained through the speed and altitude values within the original flight plan for the specific aircraft on a particular day and for that particular flight. These will become apparent from the following detailed description, the accompanying drawings and the appended claims.

DETAILED DESCRIPTION

Figure 1:
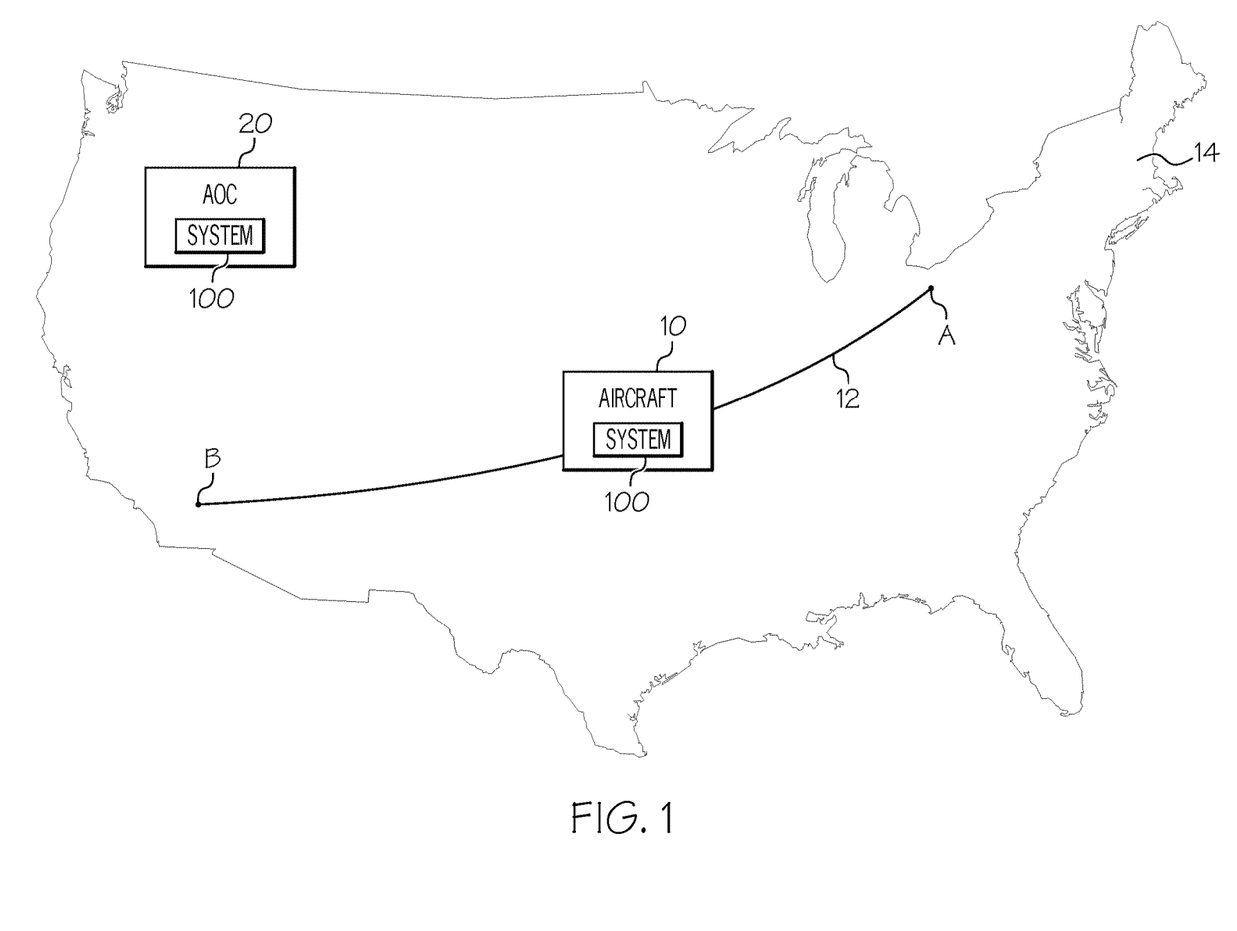
FIG. 1 is a schematic representation of an aircraft traveling along a route in accordance with an embodiment of the present disclosure.

Referring to FIG. 1, an aircraft 10 may travel from point A to point B along a route 12. Point A may correspond to a first location of interest (e.g., an airport) on the ground 14, and may have a known first set of coordinates and may be at a known first elevation. Point B may correspond to a second location of interest (e.g., an airport) on the ground 14, and may have a known second set of coordinates and may be at a known second elevation. The length of the route 12 may be known or may be calculated based on the known coordinates of points A and B.

Figure 2:
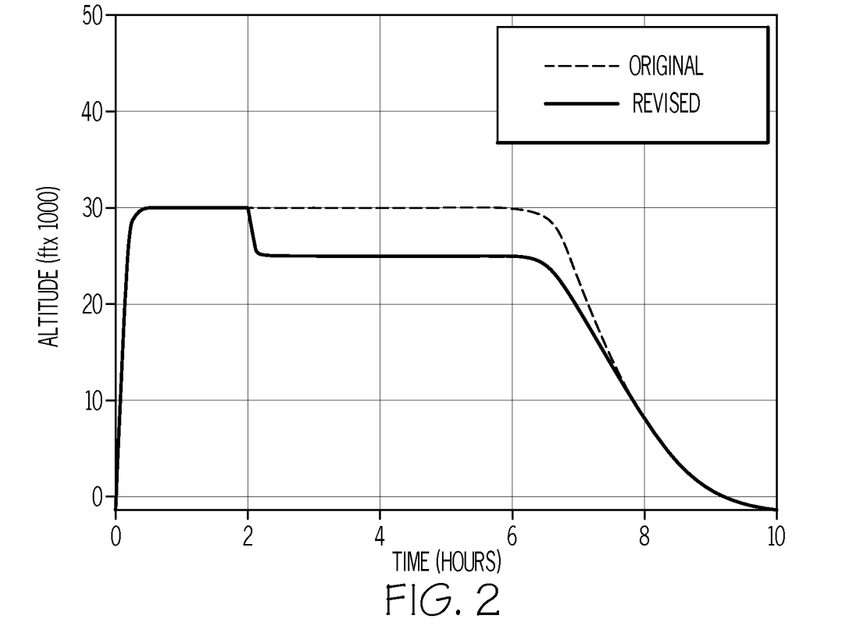
FIG. 2 is a graphical representation of altitude versus time for the aircraft of FIG. 1.
Figure 3:
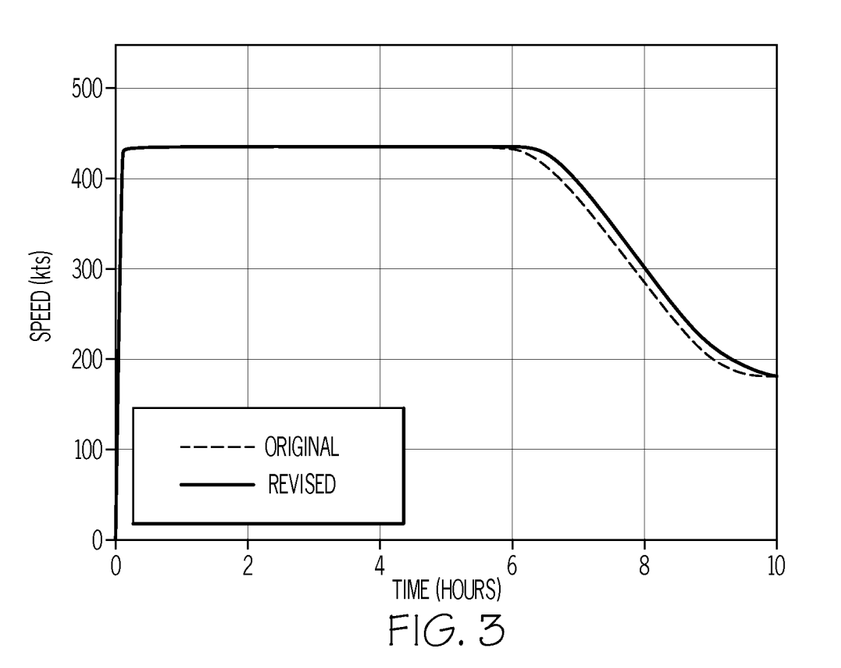
FIG. 3 is a graphical representation of speed versus time for the aircraft of FIG. 1.

Referring now to FIGS. 1-3, at any particular time during the flight from point A to point B, the aircraft 10 may have a particular trajectory (e.g., an altitude and a speed) in accordance with an original flight plan. The altitude component of the trajectory of the aircraft (as a function of time) is shown with a broken line ("Original") in FIG. 2. The speed component of the trajectory of the aircraft (as a function of time) is shown with a broken line ("Original") in FIG. 3.

The trajectory of the aircraft 10 may be revised during the flight from point A to point B. As one example, the altitude of the aircraft 10 may increase, with or without a corresponding change in speed. As another example, the altitude of the aircraft 10 may decrease, with or without a corresponding change in speed. As another example, the speed of the aircraft 10 may increase, with or without a corresponding change in altitude. As another example, the speed of the aircraft 10 may decrease, with or without a corresponding change in altitude. As yet another example, both the altitude and the speed of the aircraft 10 may be revised simultaneously.

The trajectory (e.g., the altitude and/or the speed) of the aircraft 10 may be revised mid-flight for various reasons. In one contemplated situation, a mid-flight trajectory revision may be issued by Air Traffic Control, such as to avoid turbulence and/or adverse weather conditions. In another contemplated situation, a mid-flight trajectory revision may be initiated by the pilot of the aircraft 10, such as by negotiating with, and obtaining approval from, Air Traffic Control. In yet another contemplated situation, a mid-flight trajectory revision may be initiated by the Airline Operations Center (AOC) 20 associated with the aircraft 10, such as by negotiating with, and obtaining approval from, Air Traffic Control. Mid-flight trajectory revisions initiated by the pilot of the aircraft 10 and/or the Airline Operations Center 20 may be for the purpose of avoiding turbulence/weather (a flight operating decision) and/or for the purpose of reducing or increasing the fuel consumption of the aircraft 10 (a business decision that inherently accommodates the airline's business model via the original flight plan for the aircraft 10. Speeding up to meet a connection may be more important or cost effective to the airline than slowing down to save fuel).

Still referring to FIGS. 1-3 and particularly to FIGS. 2 and 3, as one specific, non-limiting example, the aircraft 10 may execute a mid-flight trajectory revision two hours into the flight, wherein the aircraft 10 descends 5,000 feet while maintaining the same cruising speed (e.g., 435 knots). The altitude component of the mid-flight trajectory revision is shown with a solid line ("Revised") in FIG. 2. The speed component of the mid-flight trajectory revision is shown with a solid line ("Revised") in FIG. 3.

The plots shown in FIGS. 2 and 3 can be generated by the disclosed system 100 (FIG. 4) based on the original trajectory (per the original flight plan) and the mid-flight trajectory revision. Additionally, the following information may be known in connection with the original flight plan that accounts for the performance characteristics of a particular aircraft 10 (FIG. 1) and embraces the aircraft's efficiency curve of FIG. 6 and, therefore, may be used to generate the original and revised trajectory plots: (1) starting (point A) and ending (point B) altitudes; (2) starting (point A) and ending (point B) speeds (e.g., takeoff and landing speeds); (3) starting (point A) and ending (point B) times (e.g., departure and arrival times); (4) climb end time and descent start time; and (5) rate of climb and/or descent factor.

When executing a mid-flight trajectory revision, the deviation from the original trajectory set out in the original flight plan will result in a corresponding change in fuel consumption for the flight (a fuel consumption differential). The fuel consumption may either increase or decrease, depending on the type and extent of the mid-flight trajectory revision. For example, a particular aircraft 10 (FIG. 1) executing the mid-flight trajectory revision shown in FIGS. 2 and 3 may experience a fuel saving of about 1,270 gallons with respect to the original flight plan. In other words, if the aircraft 10 did not descend 5,000 feet after two hours, but rather maintained the original trajectory, the aircraft 10 would have consumed an additional 1,270 gallons of fuel before arriving at point B. Alternatively and assuming no change in speed, if the mid-flight trajectory revision required a climb (rather than a descent) of 5,000 feet, the associated fuel consumption would have increased, rather than decreased, due to the mid-flight trajectory revision.

While the present disclosure focuses on the speed and altitude components of the trajectory of the aircraft 10, a lateral deviation from the original route 12 is another contemplated mid-flight trajectory revision. Such a lateral deviation may correspond to a change in the effective length of the route 12 (e.g., shortening or extending the route 12) and, therefore, may result in a corresponding fuel consumption differential.

The disclosed system and method for calculating a fuel consumption differential corresponding to an aircraft trajectory revision may provide an indication (e.g., a visual indication), in real-time, of how a mid-flight trajectory revision will affect the fuel consumption of the aircraft 10. Therefore, prior to executing a mid-flight trajectory revision, the pilot of the aircraft 10 and/or the Airline Operations Center 20 may use the disclosed system/method to evaluate a prescribed mid-flight trajectory revision and/or to evaluate and propose a mid-flight trajectory revision (e.g., a hypothetical revised trajectory). For example, in the event that Air Traffic Control prescribes a mid-flight trajectory revision, the disclosed system/method may be used to evaluate the prescribed mid-flight trajectory revision and, if needed or desired, to propose an alternative to the prescribed mid-flight trajectory revision.

Figure 4:
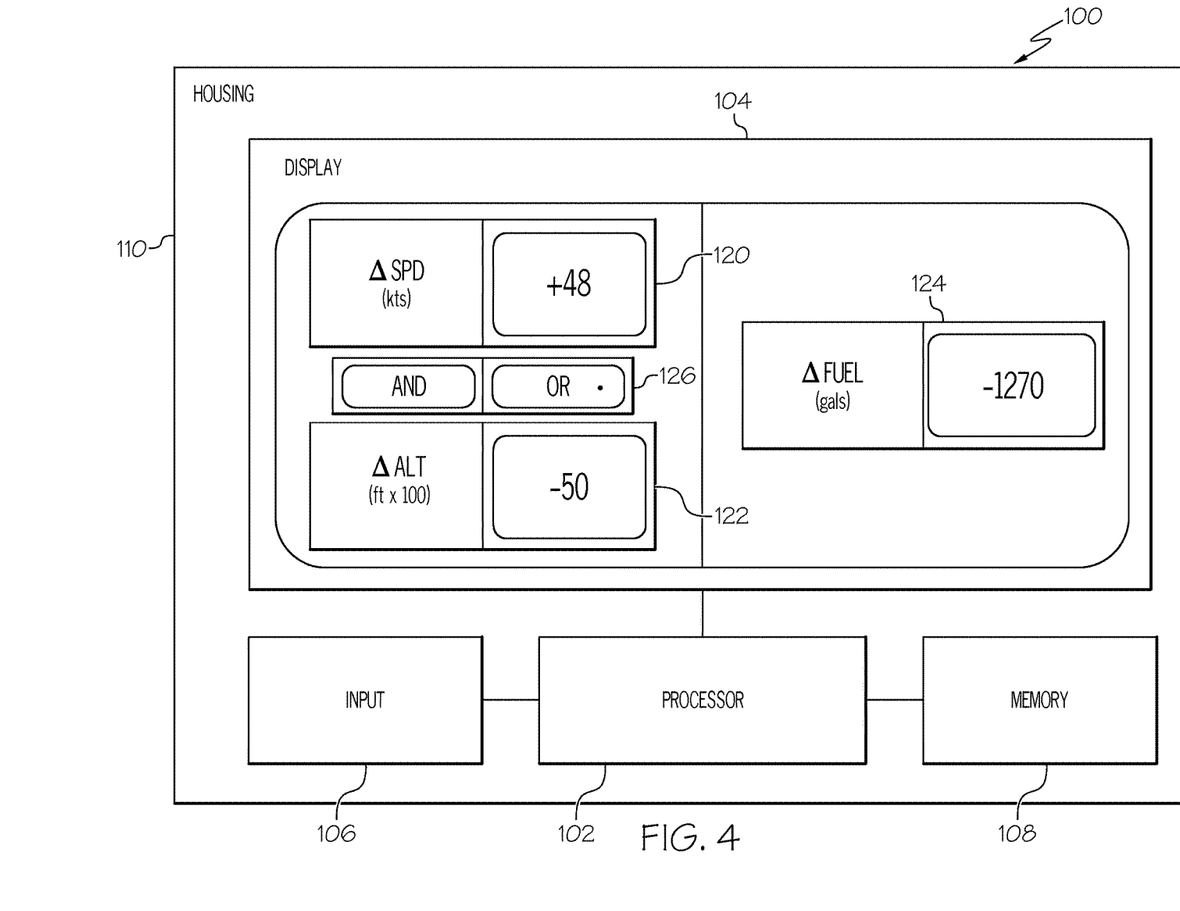
FIG. 4 is a block diagram depicting one embodiment of the disclosed system for calculating a fuel consumption differential corresponding to an aircraft trajectory revision.

Referring to FIG. 4, one embodiment of the disclosed system for calculating a fuel consumption differential corresponding to an aircraft trajectory revision, generally designated 100, may include a processor 102, a display device 104, an input device 106 and a memory device 108. Optionally, the system 100 may further include a housing 110, and the processor 102, the display device 104, the input device 106 and the memory device 108 may be supported, at least partially, within the housing 110. The system 100 may include additional components (e.g., an output device, such as a speaker) without departing from the scope of the present disclosure.

Briefly referring to FIG. 1, the system 100 may be located on the aircraft 10, such as on the flight deck of the aircraft 10. Therefore, the system 100 may be readily accessible to the pilot (or pilots) of the aircraft 10. Alternatively, or additionally, the system 100 may be located within the Airline Operations Center 20 associated with the aircraft 10. Therefore, the system 100 may be used by personnel at the Airline Operations Center 20, whether independently of, or in conjunction with, the pilot of the aircraft 10.

Referring back to FIG. 4, the processor 102 of the system 100 may be in communication with the display device 104, the input device 106 and the memory 108. The processor 102 may function in accordance with a computer-readable code to process input data received from the input device 106 and/or the memory device 108, and to output information by way of the display device 104.

The computer-readable code may be provided to the processor 102 of the system 100 by way of the memory device 108. Those skilled in the art will appreciate that the memory device 108 may be (or may include) any suitable computer-readable storage media. Examples of computer-readable storage media suitable for use as (or in) the memory device 108 include, but are not limited to, solid-state memory, optical storage media, and magnetic storage media.

Data may be input to the processor 102 of the system 100 by way of the input device 106. As one example, the input device 106 may be a user interfacing input device, such as a keyboard, a mouse, a joystick, a microphone, a touch screen, switches, or the like. As another example, the input device 106 may be a data port, such as a USB port, or a data link, such as a data link with one or more sensors (e.g., a speed sensor and/or an altimeter), through which data may be input and transmitted to the processor 102 and/or locally stored in the memory device 108.

Various data may be input by way of the input device 106 of the system 100. In one expression, the original flight plan, including the original trajectory, of the aircraft 10 (FIG. 1) may be input by way of the input device 106. For example, the original flight plan may be input into the system 100 by way of the input device 106 prior to the aircraft 10 departing from point A (FIG. 1). In another expression, a revised trajectory may be input by way of the input device 106. For example, the pilot of the aircraft 10 may input into the system 100 a revised speed and/or a revised altitude using the input device 106.

The display device 104 of the system 100 may provide a mechanism for displaying information that may be useful to the pilot of the aircraft 10 (FIG. 1) and/or personnel at the Airline Operations Center 20 (FIG. 1). The display device 104 may be (or may include) a computer screen, a tablet, a touch screen device, an electronic (e.g., digital) instrument display, an analog dial, a gauge, or any other suitable type of display device.

The display device 104 of the system 100 may display various input data and/or processor-generated data as information items 120, 122, 124, 126. Information item 120 may indicate the revised speed (e.g., 48 knots faster), which may be input into the system 100 (e.g., by the pilot) or calculated by the processor 102. Information item 122 may indicate the revised altitude (e.g., 5,000 feet lower), which may be input into the system 100 (e.g., by the pilot) or calculated by the processor 102. Information item 124 may indicate the fuel consumption differential associated with executing the revised trajectory rather than the original trajectory (e.g., −1270 gallons of fuel), which may be calculated by the processor 102.

For example, a user of the system 100 (e.g., a pilot of the aircraft 10 or personnel at the Airline Operations Center 20) may enter (e.g., by way of input device 106) a mid-flight trajectory revision (e.g., a revised altitude change of −5,000 feet). The processor 102 may receive the mid-flight trajectory revision and may display the input data on the display device 104 (e.g., as information item 122). Additionally, the processor 102 may calculate a fuel consumption differential (e.g., −1,270 gallons) associated with executing the mid-flight trajectory revision, and may display the processor-generated data on the display device 104 (e.g., as information item 124).

Optional information item 126 on the display device 104 of the system 100 may indicate whether the calculated fuel consumption differential (information item 124) is based on either a revised speed (information item 120) or a revised altitude (information item 122), but not both (e.g., "Or"), or based on both a revised speed (information item 120) and a revised altitude (information item 122) (e.g., "And"). When information item 126 is indicating the "And" option has been selected, then information items 120, 122 may be based on data input into the system 100 (e.g., by the pilot using input device 106). When information item 126 is indicating the "Or" option has been selected, as shown in FIG. 4, then one of information items 120 and 122 may be based on data input into the system 100 (e.g., by the pilot using input device 106), while the other is based on data calculated by the processor 102 as an alternative trajectory revision option.

For example, when information item 126 on the display device 104 of the system 100 is indicating the "Or" option has been selected, a user (e.g., a pilot of the aircraft 10) may enter (e.g., by way of input device 106) a revised altitude (e.g., −5,000 feet), which will be displayed on display device 104 as information item 122. The processor 102 may then calculate the corresponding fuel consumption differential and display the value on the display device 104 as information item 124. Additionally, the processor 102 may calculate a revised speed that would have the same effect on fuel consumption as the input revised altitude, and will display the calculated revised speed on the display device 104 as information item 120. Therefore, using the example shown in FIG. 4, when a pilot selects the "Or" option (see information item 126) and inputs a revised altitude of −5,000 feet (see information item 122), the processor 102 indicates that (1) the mid-flight trajectory (altitude) revision will result in a fuel savings of 1,270 gallons (see information item 124) and (2) a revised speed of +48 knots (see information item 120) will result in the same fuel savings (1,270 gallons) as a revised altitude of −5,000 feet (see information item 122).

The processor 102 of the system 100 may employ the disclosed method for calculating a fuel consumption differential corresponding to an aircraft trajectory revision to populate the fuel consumption differential field (information item 124) on the display device 104. Specifically, the processor 102 may calculate the fuel consumption differential associated with a mid-flight trajectory revision based on excess energy calculations for the original and the revised trajectories. Significantly, the total fuel burn associated with both the original and the revised trajectories need not (and generally is not) calculated.

Figure 5:
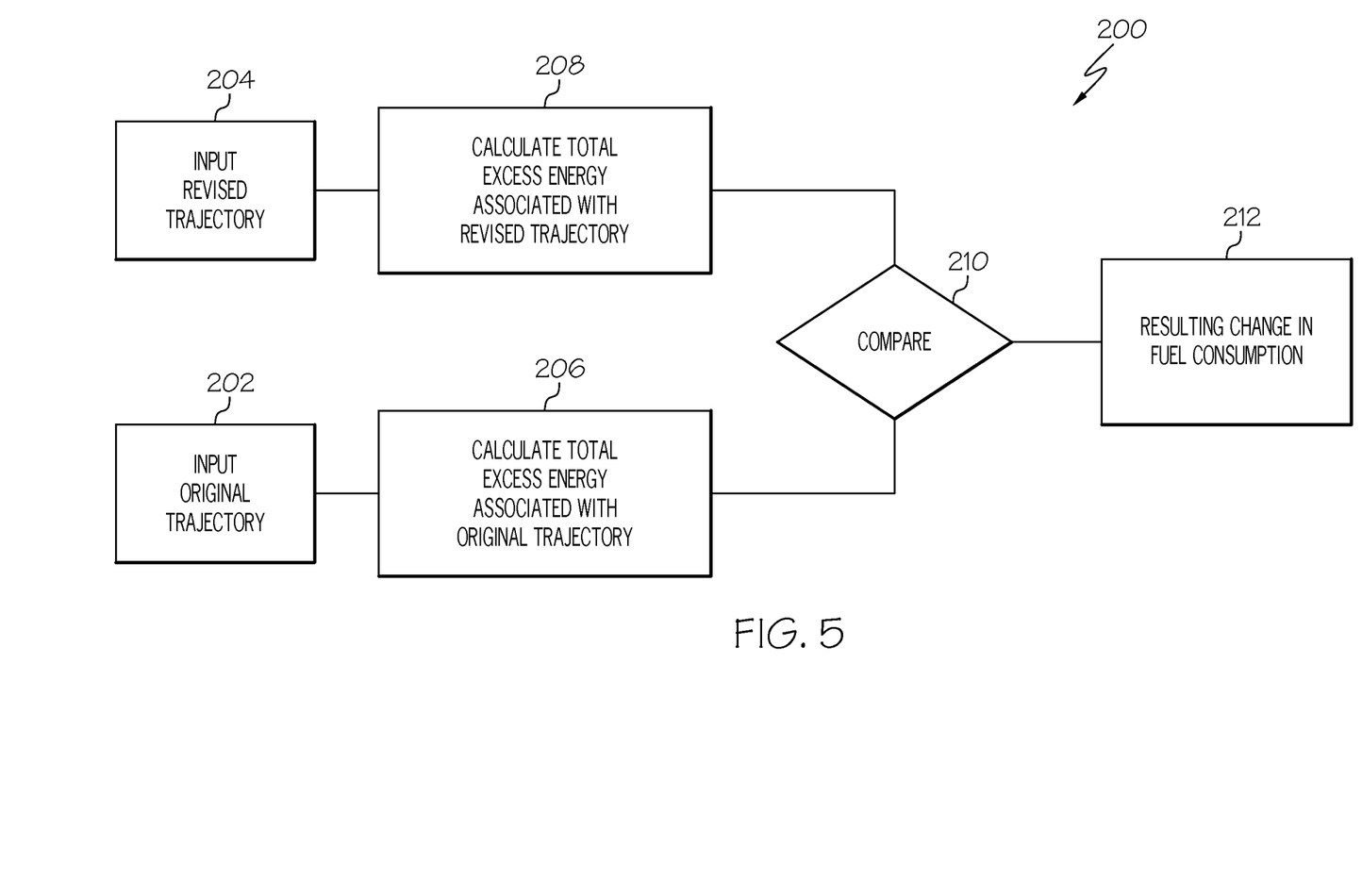
FIG. 5 is a flow diagram depicting one embodiment of the disclosed method for calculating a fuel consumption differential corresponding to an aircraft trajectory revision.

Thus, also disclosed is a method for calculating a fuel consumption differential corresponding to an aircraft trajectory revision. One embodiment of the disclosed method for calculating a fuel consumption differential corresponding to an aircraft trajectory revision is shown in FIG. 5 and generally designated 200. The method 200 may begin at Blocks 202 and 204, though not necessarily simultaneously (e.g., Block 202 may be performed prior to Block 204).

At Block 202, the original trajectory may be input into the system 100 (FIG. 4), such as by way of the input device 106 (FIG. 4). For example, the original flight plan may be input into the system 100 prior to the start of the flight. Using the original trajectory (and other known data), the original altitude and speed versus time plots may be generated, as shown with broken lines ("Original") in FIGS. 2 and 3.

At Block 204, the revised trajectory may be input into the system 100 (FIG. 4), such as by way of the input device 106 (FIG. 4). For example, Air Traffic Control may contact the pilot of the aircraft 10 (FIG. 1) and may instruct the pilot to assume a revised trajectory (e.g., descend 5,000 feet). The pilot of the aircraft 10 may then enter the revised trajectory into the system 100, such as by updating the change in altitude field (information item 122 in FIG. 4) on the display device 104 (FIG. 4). Using the revised trajectory (and other known data), the revised altitude and speed versus time plots may be generated, as shown with solid lines ("Revised") in FIGS. 2 and 3.

At Block 206, the total excess energy associated with the original trajectory—from a desired revised trajectory execution time through the remainder of the flight—may be calculated (a first total excess energy). The total excess energy associated with the original trajectory may be the sum of the excess energy due to climb and the excess energy due to flying at a non-ideal altitude for a given speed (the original trajectory's deviation from the aircraft's efficiency curve).

The excess energy $E_{C1}$ due to climb associated with the original trajectory may be calculated as follows:

$$E_{C1} = \int_{t_0}^{t_{end}} F_{ex} \cdot ds \tag{Eq. 1}$$

wherein $t_0$ is the revised trajectory execution time, $t_{end}$ is end of flight time, $F_{ex}$ is the excess thrust due to climb, and $ds$ is the incremental displacement. The excess thrust $F_{ex}$ may be thrust minus drag. Therefore, the relevant equations of motion, both vertical (Equation 2) and horizontal (Equation 3), may be as follows:

$$F_{ex} \sin(c) + L \cos(c) - W = ma_v \tag{Eq. 2}$$

$$F_{ex} \cos(c) - L \sin(c) = ma_h \tag{Eq. 3}$$

wherein c is the climb angle, L is the lift, W is the weight, m is the mass of the aircraft, and a is the acceleration, which includes a vertical component $a_v$ and a horizontal component $a_h$.

The flight path will be pre-defined, such that the climb angle c, the displacement ds, and the acceleration vectors $a_v$, $a_h$ are known. The mass m of the aircraft 10 at takeoff is also known, and will decrease in accordance with a known trend as fuel is consumed throughout the flight. Therefore, the excess energy $E_{C1}$ due to climb associated with the original trajectory may be calculated using Equations 1-3.

At cruising speed, the excess thrust $F_{ex}$ will be zero and, therefore, the excess energy $E_{C1}$ due to climb will also be zero. However, assuming the aircraft 10 will glide when descending, the excess energy $E_{C1}$ associated with a descent may be assumed to be zero assuming the speed approximates the contour of the altitude vs speed profile in FIG. 6. As such, excess energy $E_{C1}$ due to climb will be the only factor in the total excess energy during a climb.

The excess energy $E_{E1}$ due to flying at a non-ideal altitude for a given speed associated with the original trajectory may be calculated as follows:

$$E_{E1} = \int_{t_0}^{t_{end}} P \cdot dt \tag{Eq 4}$$

wherein P is power and dt is incremental time.

For any given aircraft, altitude and flying condition, there exists a most efficient, theoretically ideal speed at which the least amount of power is required. Plotting these ideal speeds over a range of altitudes yields an aircraft efficiency curve. The excess energy $E_{E1}$ is the amount of additional energy an aircraft consumes due to the aircraft not flying on the efficiency curve (e.g., at the ideal altitude and speed combination).

Figure 6:
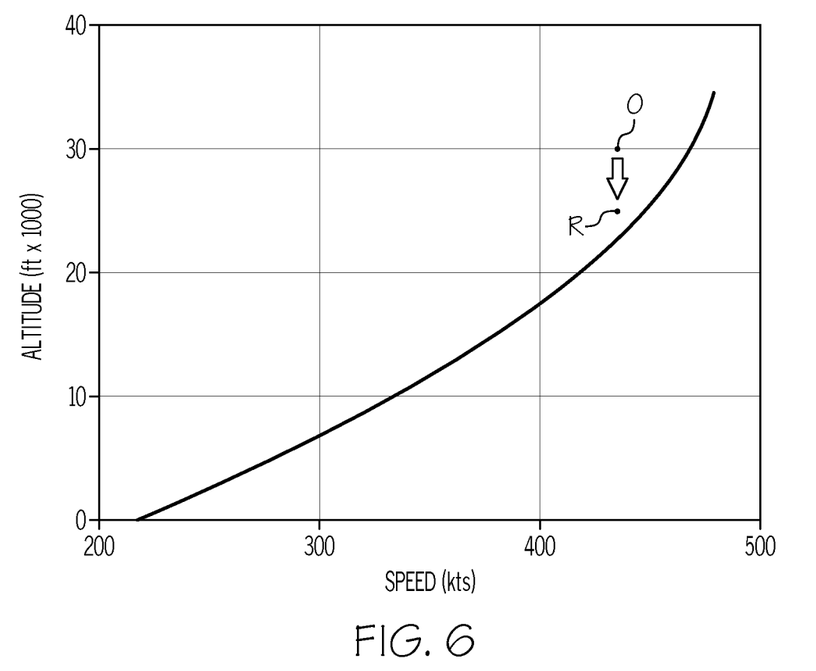
FIG. 6 is a graphical representation of an efficiency curve (altitude versus speed) for the aircraft of FIG. 1.

An example efficiency curve for aircraft 10 (FIG. 1) is shown in FIG. 6. Using the trajectory data shown in FIGS. 2 and 3, pursuant to the original trajectory, the aircraft 10 is flying at 435 knots and 30,000 feet, as shown by point O in FIG. 6. However, the ideal altitude at 435 knots is about 23,000 feet. Therefore, the original trajectory has the aircraft 10 about 7,000 feet higher than the ideal altitude at the relevant speed (435 knots). As such, the power requirement of the aircraft 10 is correspondingly higher.

Thus, the total excess energy $E_{T1}$ associated with the original trajectory may be calculated based on the excess energy $E_{C1}$ due to climb and the excess energy $E_{E1}$ due to flying at a non-ideal altitude for a given speed, as follows:

$$E_{T1} = E_{C1} + E_{E1} \tag{Eq. 5}$$

At Block 208, the total excess energy associated with the revised trajectory—from a desired revised trajectory execution time through the remainder of the flight—may be calculated (a second total excess energy). The total excess energy associated with the revised trajectory may be the sum of the excess energy due to climb and the excess energy due to flying at a non-ideal altitude for a given speed (the revised trajectory's deviation from the aircraft's efficiency curve).

The excess energy $E_{C2}$ due to climb associated with the revised trajectory may be calculated as follows:

$$E_{C2} = \int_{t_0}^{t_{end}} F_{ex} \cdot ds \tag{Eq 6}$$

wherein $t_0$ is the revised trajectory execution time, $t_{end}$ is end of flight time, $F_{ex}$ is the excess thrust due to climb (see Equations 2 and 3, above), and ds is the incremental displacement.

The excess energy $E_{E2}$ due to flying at a non-ideal altitude for a given speed associated with the revised trajectory may be calculated as follows:

$$E_{E2} = \int_{t_0}^{t_{end}} P \cdot dt \tag{Eq 7}$$

wherein P is power and dt is incremental time.

Referring again to FIG. 6, pursuant to the revised trajectory, the aircraft 10 is flying at 435 knots and 25,000 feet, as shown by point R. With the ideal altitude at 435 knots being about 23,000 feet, the revised trajectory brings the aircraft 10 much closer to its efficiency curve. Specifically, at the revised trajectory, the aircraft 10 is about 2,000 feet higher than the ideal altitude (at the relevant speed of 435 knots), while the original trajectory had the aircraft 10 about 7,000 feet higher than the ideal altitude. Therefore, while the power requirement of the aircraft 10 flying the revised trajectory will be higher than if the aircraft 10 were at the ideal altitude, the power requirement will not be as high as if the aircraft were flying the original trajectory.

Thus, the total excess energy $E_{T2}$ associated with the revised trajectory may be calculated based on the excess energy $E_{C2}$ due to climb and excess energy $E_{E2}$ due to flying at a non-ideal altitude for a given speed, as follows:

$$E_{T2}=E_{C2}+E_{E2} \qquad (Eq. 8)$$

At Block 210, the total excess energy $E_{T2}$ associated with the revised trajectory may be compared to the total excess energy $E_{T1}$ associated with the original trajectory. For example, a total excess energy differential $\Delta E_{ex}$ may be calculated based on the total excess energy $E_{T2}$ associated with the revised trajectory and the total excess energy En associated with the original trajectory, as follows:

$$\Delta E_{ex}=E_{T2}-E_{T1} \qquad (Eq. 9)$$

The total excess energy differential $\Delta E_{ex}$ may provide an indication of whether the revised trajectory offers a fuel efficiency gain or a fuel efficiency loss. Specifically, when the total excess energy differential $\Delta E_{ex}$ is a negative number, the revised trajectory offers a fuel efficiency gain, while a fuel efficiency loss occurs when the total excess energy differential $\Delta E_{ex}$ is a positive number.

At Block 212, the total excess energy differential $\Delta E_{ex}$ may be converted into a fuel consumption differential. Depending on the fuel being used by the aircraft 10, a given volume of fuel may correspond to a certain quantity of energy. The total excess energy differential $\Delta E_{ex}$ may be divided by the energy density of the fuel, thereby yielding the fuel consumption differential.

As discuss above, the fuel consumption differential value calculated using the disclosed method 200 may be used to populate the fuel consumption differential field (information item 124) on the display device 104 of the disclosed system 100. Alternatively (or additionally), the total excess energy differential $\Delta E_{ex}$ may be presented on the display device 104 of the disclosed system 100.

Accordingly, the disclosed system 100 and method 200 may allow pilots and aircraft operators to quickly evaluate a mid-flight trajectory revision (or multiple mid-flight trajectory revisions) to determine the effects such revisions have on aircraft fuel economy. Therefore, the disclosed system 100 and method 200 may facilitate in-flight negotiations between pilots (and/or an associated Airline Operations Center) and Air Traffic Control with the aim of selecting a revised trajectory that will yield greater fuel efficiency.

Although various embodiments of the disclosed system and method for calculating a fuel consumption differential corresponding to an aircraft trajectory revision have been shown and described, modifications may occur to those skilled in the art upon reading the specification. The present application includes such modifications and is limited only by the scope of the claims.

What is claimed is:

1. A computer-implemented method for controlling a flight path of an aircraft based on a calculated fuel consumption differential corresponding to said aircraft changing from an original trajectory to a revised trajectory at an execution time occurring mid-flight, said method comprising:
   storing, on a memory device operably coupled with a processor, said original trajectory;
   inputting, by a user-interactive input device, said revised trajectory on said memory device;
   calculating, by said processor, a first total excess energy associated with flying said aircraft at said original trajectory beginning at said execution time and ending at an end of flight time, said first total excess energy comprising excess energy due to climb and excess energy due to deviation of said original trajectory from an efficiency curve of said aircraft;
   calculating, by said processor, a second total excess energy associated with flying said aircraft at said revised trajectory beginning at said execution time and ending at said end of flight time, said second total excess energy comprising excess energy due to climb and excess energy due to deviation of said revised trajectory from said efficiency curve;
   comparing, by said processor, said second total excess energy with said first total excess energy to obtain a total excess energy differential;
   calculating, by said processor, said fuel consumption differential based on said total excess energy differential;
   displaying, by a user-interactive display device operably coupled with said processor, said fuel consumption differential, as a fuel consumption gain or a fuel consumption loss;
   selecting one of said original trajectory or said revised trajectory based on said fuel consumption differential; and
   controlling said flight path of said aircraft according to a selected one of said original trajectory or said revised trajectory.

2. The method of claim 1 wherein said revised trajectory comprises a change in altitude.

3. The method of claim 2 wherein said revised trajectory further comprises a change in speed.

4. The method of claim 2 wherein said change in altitude occurs without a corresponding change in speed.

5. The method of claim 1 wherein said revised trajectory comprises a change in speed.

6. The method of claim 5 wherein said change in speed occurs without a corresponding change in altitude.

7. The method of claim 1 wherein said first total excess energy consists of said excess energy due to climb at said original trajectory and said excess energy due to deviation of said original trajectory from said efficiency curve.

8. The method of claim 7 wherein said second total excess energy consists of said excess energy due to climb at said revised trajectory and said excess energy due to deviation of said revised trajectory from said efficiency curve.

9. The method of claim 1 wherein said original trajectory comprises an original altitude and an original speed, and wherein said excess energy due to deviation of said original trajectory from said efficiency curve is based on a difference between said original altitude and an ideal altitude at said original speed.

10. The method of claim 1 wherein said revised trajectory comprises a revised altitude and a revised speed, and wherein said excess energy due to deviation of said revised trajectory from said efficiency curve is based on a difference between said revised altitude and an ideal altitude at said revised speed.

11. The method of claim 1 wherein said aircraft consumes fuel, said fuel having an energy density, and wherein said fuel consumption differential is calculated based on said total excess energy differential and said energy density.

12. The method of claim 1 wherein said user-interactive display device is located on said aircraft.

13. The method of claim 1 wherein said user-interactive display device is located at an Airline Operations Center associated with said aircraft.

14. The method of claim 1 wherein said revised trajectory is prescribed by Air Traffic Control.

15. The method of claim 1 wherein said revised trajectory is a hypothetical revised trajectory.

16. A computer-implemented method for controlling a flight path of an aircraft based on a calculated fuel consumption differential corresponding to said aircraft changing from an original speed and an original altitude to a revised speed and a revised altitude at an execution time occurring mid-flight, said method comprising:

storing, on a memory device operably coupled with a processor, said original speed and said original altitude;

inputting, by a user-interactive input device, said revised speed and a revised altitude on said memory device;

calculating, by said processor, a first total excess energy associated with flying said aircraft at said original speed and said original altitude beginning at said execution time and ending at an end of flight time, said first total excess energy comprising excess energy due to a difference between said original altitude and an ideal altitude for said original speed;

calculating, by said processor, a second total excess energy associated with flying said aircraft at said revised speed and said revised altitude beginning at said execution time and ending at an end of flight time, said second total excess energy comprising excess energy due to climb, if said revised altitude is greater than said original altitude, and excess energy due to a difference between said revised altitude and an ideal altitude for said revised speed;

comparing, by said processor, said second total excess energy with said first total excess energy to obtain a total excess energy differential;

calculating, by said processor, said fuel consumption differential based on said total excess energy differential; and displaying, by a user-interactive display device operably coupled with said processor, said fuel consumption differential, as a fuel consumption gain or a fuel consumption loss;

selecting one of said original speed and said original altitude or said revised speed and said revised altitude based on said fuel consumption differential; and controlling said flight path of said aircraft according to a selected one of said original speed and said original altitude or said revised speed and said revised altitude.

17. A computer-implemented system for controlling a flight path of an aircraft based on a calculated fuel consumption differential corresponding to said aircraft changing, at an execution time mid-flight, from an original trajectory to a revised trajectory, said system comprising:

a processor;

a memory device operably coupled with said processor, said original trajectory being stored on said memory device;

a user-interactive input device operably coupled with said processor, said revised trajectory being stored on said memory device via input by said user-interactive input device; and a user-interactive display device operably coupled with said processor, said user-interactive display device being operable to display said calculated fuel consumption differential, as a fuel consumption gain or a fuel consumption loss; and wherein:

said processor is operable, based on instructions executed by said processor, to:

calculate a fuel consumption differential based on a comparison of:

a first total excess energy associated with flying said aircraft at said original trajectory beginning at said execution time and ending at an end of flight time, said first total excess energy comprising excess energy due to climb and excess energy due to deviation of said original trajectory from an efficiency curve of said aircraft; and a second total excess energy associated with flying said aircraft at said revised trajectory beginning at said execution time and ending at said end of flight time, said second total excess energy comprising excess energy due to climb and excess energy due to deviation of said revised trajectory from said efficiency curve;

select one of said original trajectory or said revised trajectory based on said calculated fuel consumption differential; and control said flight path of said aircraft according to a selected one of said original trajectory or said revised trajectory.

18. The system of claim 17 wherein said user-interactive display device is located on said aircraft.

19. The system of claim 17 wherein said user-interactive display device is located at an Airline Operations Center.

20. The system of claim 17 wherein said user-interactive display device comprises a computer screen having an electronic instrument display.

* * * * *